Sept. 15, 1964     O. C. NIEDERER ETAL     3,148,761
EGG SUPPORTING AND HANDLING MEANS
Filed Feb. 2, 1962     3 Sheets-Sheet 1
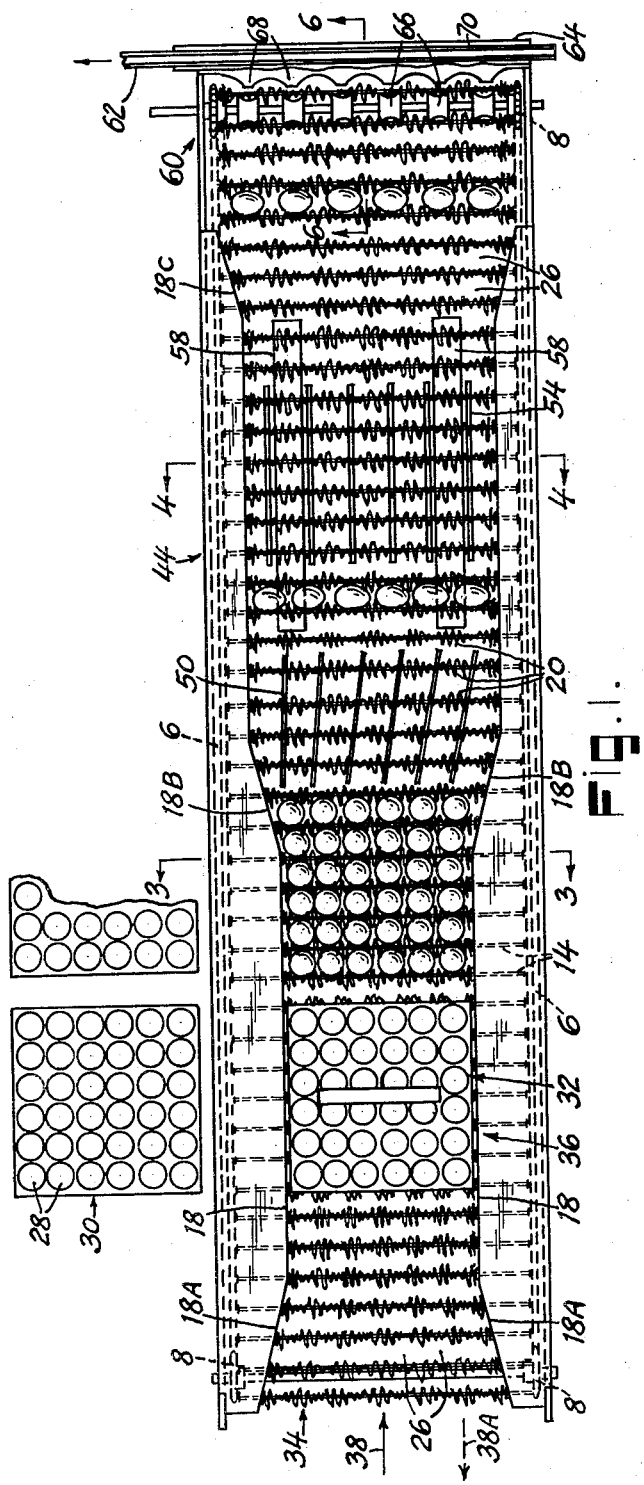
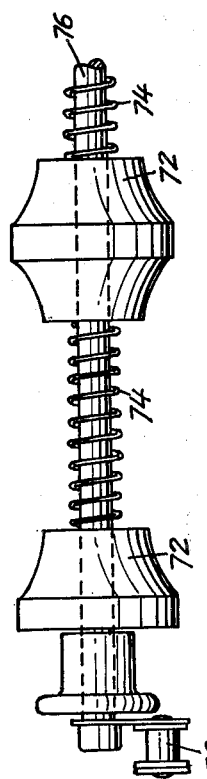
INVENTORS
OTTO C. NIEDERER
BY HERBERT O. NIEDERER
ATTORNEY

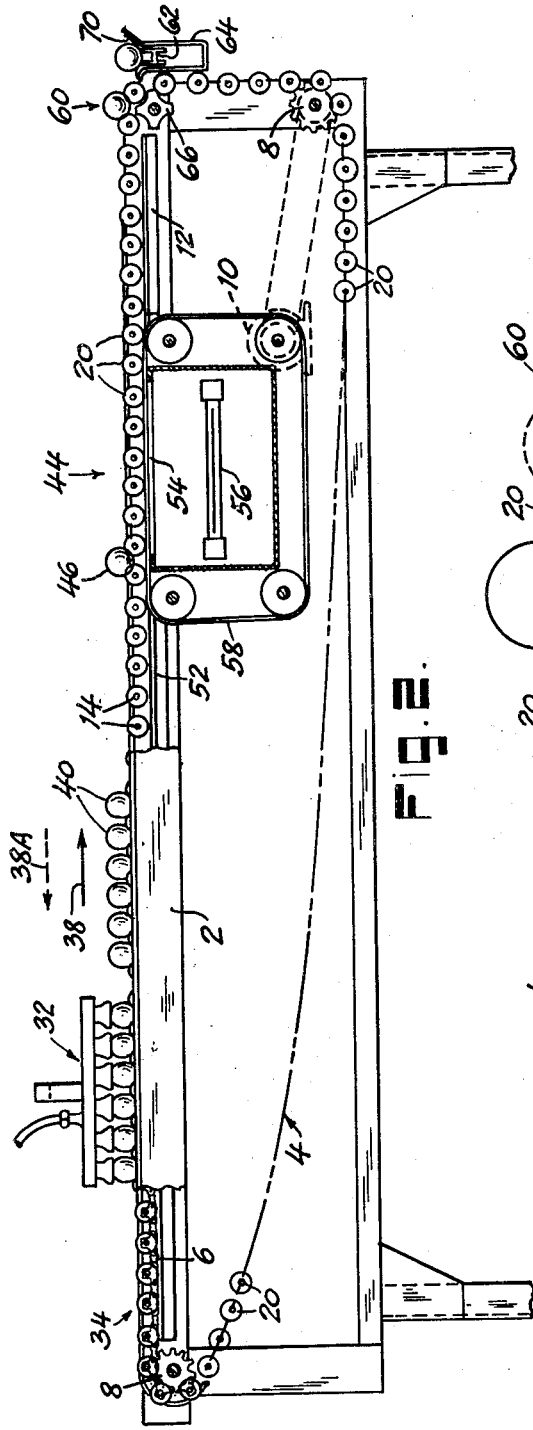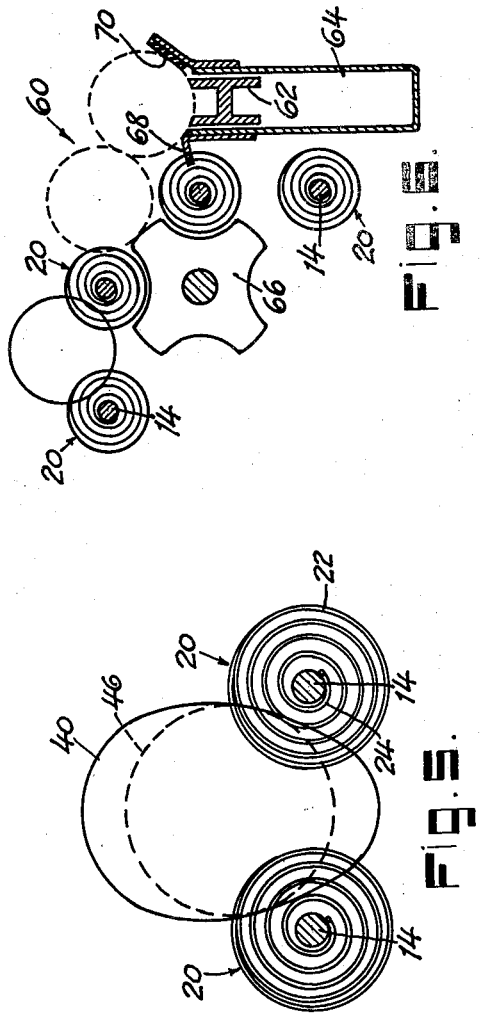

Sept. 15, 1964                O. C. NIEDERER ETAL                3,148,761
                      EGG SUPPORTING AND HANDLING MEANS
Filed Feb. 2, 1962                                         3 Sheets-Sheet 3
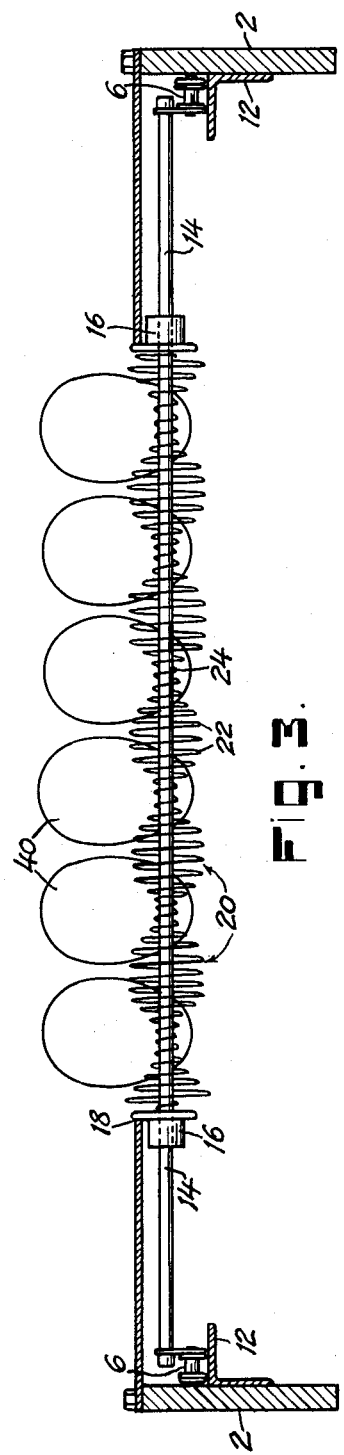
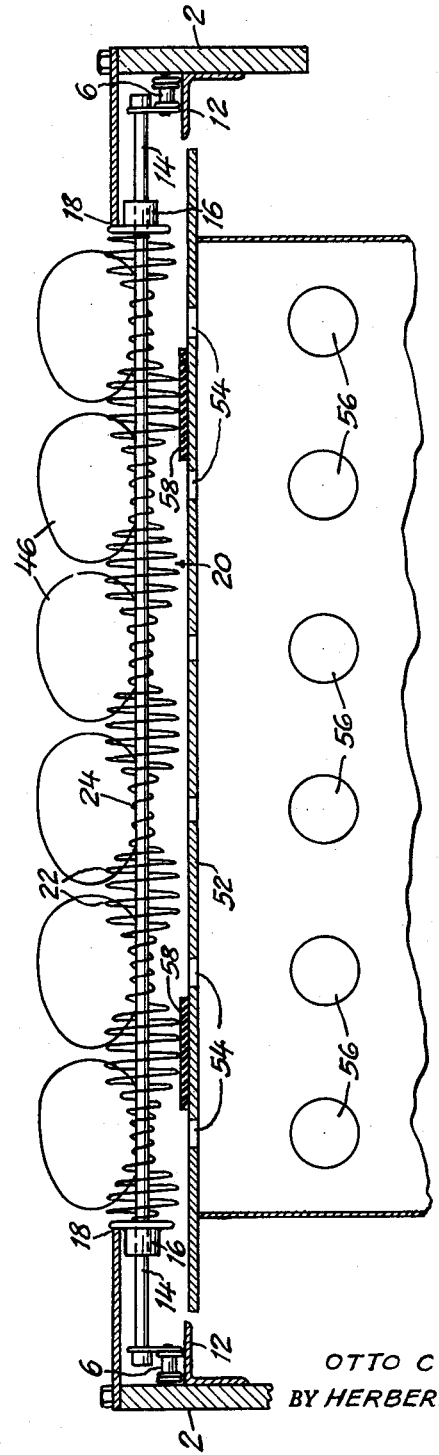
INVENTORS
OTTO C. NIEDERER
BY HERBERT O. NIEDERER
ATTORNEY United States Patent Office 3,148,761
Patented Sept. 15, 1964

3,148,761
EGG SUPPORTING AND HANDLING MEANS
Otto C. Niederer, Bear Tavern Road, and Herbert O. Niederer, Church Road, both of Titusville, N.J.
Filed Feb. 2, 1962, Ser. No. 170,768
15 Claims. (Cl. 198—33)

This invention relates to equipment for supporting and positioning articles and is directed particularly to equipment for conveying, arranging and handling eggs.

It is common practice in the handling of eggs to remove a whole tray or layer of eggs from a crate by means of vacuum or other types of lifting mechanisms. The eggs may then be deposited on a conveyor or other surface in groups for subsequent candling, washing, grading or performing other operations. However, when so deposited, the eggs generally are not spaced or positioned in such a manner as to permit the performing of other operations without rearrangement of the eggs. Thus, the eggs are generally arranged in an egg crate with their long axes vertical and about 1⅞ inches on center, with the larger ends of the eggs facing upward, and they are deposited on a conveyor or support by the lifting means while so spaced and arranged. On the other hand, eggs generally should be arranged with their long axes horizontal when being candled whereas the axes of the eggs should be horizontal and the eggs should be spaced a substantial distance apart if they are to be passed to an egg grader. Moreover, when washing eggs or performing other operations, it is sometimes desirable to change the position of the eggs from that in which they are deposited on a support or conveyor by an egg lifting device.

Such changes in the positions and arrangement of eggs have heretofore been effected by transferring the eggs from one conveying or handling means to another which may be moving transversely of the conveyor on which the eggs are first deposited. Even then it is not always easy and convenient to arrange the eggs in the manner desired and there is always danger of breaking, checking, cracking or displacement of the eggs when they are transferred from one support or device to another.

In accordance with the present invention, these objections and limitations of prior equipment for the handling of eggs or other articles are overcome and a novel type of egg or article supporting and moving means is provided whereby the relative positions and spacing of eggs may be changed while the eggs are resting upon or carried by a support or conveyor. Moreover, such changes in the arrangement of the eggs or articles may be effected before, during or after the washing, candling or the performance of other operations on the articles.

These results and advantages of the present invention are preferably attained by providing supporting means for the eggs or articles which may be elongated or shortened to vary the spacing or positioning of the eggs or articles on the supporting means. Thus, the supporting means, which may comprise the surface of a conveyor, preferably embodies a plurality of coiled spring members which present cooperating portions defining egg receiving recesses. The spring members may then be elongated or compressed to vary the spacing or location of the egg receiving cavities without removing the eggs or articles from the supporting means.

Accordingly, the principal object of the present invention is to vary the arrangement and positioning of eggs or other articles easily and with a minimum of manipulation of the eggs or articles.

Another object of the invention is to provide novel supporting means for eggs and the like which embody spring members cooperating to define recesses or cavities for the eggs.

A further object of the invention is to provide conveying means for receiving and arranging eggs or the like wherein a plurality of coiled spring members are held in parallel relation and formed to provide cooperating egg receiving recesses therebetween, together with means for varying the length of the spring members and the spacing of the egg receiving recesses.

These and other objects and features of the present invention will appear from the following description thereof wherein reference is made to the figures of the accompanying drawing.

In the drawing:

FIG. 1 is a top plan view of a typical form of equipment embodying the present invention;

FIG. 2 is a longitudinal sectional view of the construction shown in FIG. 1;

FIG. 3 is a transverse sectional view of the equipment shown in FIG. 1 taken on the line 3—3 thereof;

FIG. 4 is a sectional view of the construction shown in FIG. 1 taken on the line 4—4 thereof;

FIG. 5 is a sectional view through two of the article supporting members of FIGS. 3 and 4;

FIG. 6 is a sectional view of the construction shown in FIG. 1 taken on the line 6—6; and FIG. 7 illustrates one typical modification of the egg supporting means.

In that form of the invention chosen for purposes of illustration in FIGS. 1 to 6 of the drawing, the equipment embodies a frame 2 upon which is mounted a conveyor 4 comprising two side chains 6 which pass about sprockets 8, one of which may be driven by suitable means such as a motor 10. The side chains 6 in the upper run of the conveyor 4 are supported on angle irons or other suitable track means 12 at opposite sides of the frame 2. A plurality of rods 14 extend transversely of the conveyor 4 from one of the side chains 6 to the other. Each of the rods 14 has bearing means thereon such as the flanged rollers 16 which are rotatably mounted on the rods 14 near the opposite ends thereof. Egg supporting means 20 are carried by the rods 14 and have the opposite ends thereof in engagement with the flanged rollers 16.

As shown in the drawings, the egg supporting means 20 are preferably in the form of coiled spring members which extend parallel to each other transversely of the conveying means. As shown most clearly in FIGS. 3 and 4, each of the coil springs embodies a plurality of turns of wire or other suitable material. Certain of the turns of wire, such as those indicated at 22, are of relatively large diameter and are spaced apart by the turns of wire 24 which are of relatively small diameter. The coiled springs 20 are preferably formed and arranged on the rods 14 in such a way that the portions 24 of the springs which are of relatively small diameter on adjacent coil springs 20 register with the turns 24 of small diameter on the coil spring carried by an adjacent rod 14. In this way, the turns 24 of small diameter cooperate to form egg receiving recesses or cavities 26 which are spaced apart by the turns 22 of the coiled springs which are of substantially larger diameter. Any suitable number of the egg receiving cavities 26 may be formed by the coiled spring members 20 so as to provide the desired number of egg receiving cavities transversely of the conveyor.

As shown in FIG. 1, it is usual practice to remove an entire layer of eggs 28 from a crate 30 by means of a vacuum or mechanical lifting device 32 whereby an entire layer of eggs may be deposited on a supporting surface or the conveyor of an egg handling mechanism in a single operation. In order that the egg receiving cavities 26 between the larger turns 22 of coiled springs 20 of the conveyor 4 may be positioned and spaced apart to correspond with the spacing and arrangement of the eggs carried by the egg lifting device 32, the spring members 20 may be compressed between the flanged rollers 16. For this purpose, the frame 2 of the equipment may be provided with guide surfaces 18 which are positioned above the chain supporting tracks 12 on the frame in position to be engaged by the flanged rollers 16 on the rods 14. The guide surfaces 18 preferably converge inwardly as shown at 18A in FIG. 1 adjacent the receiving end 34 of the equipment and in advance of the loading zone 36. Therefore, upon movement of the conveyor chains 6 and the rods 14 with the springs 20 thereon in the direction of the arrow 38 as shown in FIG. 1, the flanged rollers 16 at the opposite ends of the spring means 20 engage the converging guide surfaces 18A and force the rollers 16 inward toward each other. The rollers 16 then serve to compress the spring means 20 as shown in FIG. 3 whereby the length of the spring means is decreased and the egg receiving cavities 26 are positioned closer together. When the egg receiving cavities 26 are thus positioned, they will be located on the conveyor in the same positions and arrangement as are the eggs in an egg crate. It is then possible to transfer a layer or group of eggs directly from the egg crate 30 to the egg receiving cavities 26 in the conveyor by means of a conventional egg lifting device 32. Moreover, when the spring means 20 is thus compressed the egg receiving cavities 26 are rendered approximately circular in shape so that eggs deposited in the cavities by the egg lifting means will be held in the same positions as they were in the crate with their long axes parallel and vertical and the larger ends of the eggs facing upward, as shown at 40 in FIGS. 3 and 5.

Upon continued movement of the conveyor 4 with its rods 14 and spring members 20 in the direction of the arrow 38, the eggs will pass beyond the loading zone 36 and the flanged rollers 16 at the opposite ends of the spring members 20 will engage the outwardly diverging portions 18B of the guide surfaces 18. The rollers 16 will then be urged outwardly toward the conveyor chains 6 under the pressure of the spring members 20 as they approach the zone 44 of the equipment. The springs 20 are thus permitted to expand lengthwise of the rods 14 whereby the cavities 26 between the enlarged portions 22 of the spring members 20 are elongated. Moreover, the cavities are automatically spaced farther apart and serve to move the eggs 28 into positions such as those indicated at 46 in FIG. 4. The eggs, when thus moved by expansion of the spring members 20 will assume a horizontal position as shown in dotted lines in FIG. 5. Further, if desired, guide ribs 50 may be provided on a plate 52 located beneath the conveyor and in position to aid in spreading and positioning the eggs within the egg receiving cavities 26 of the conveyor.

When such horizontally positioned and spaced eggs approach the zone 44 of the equipment, they may be handled or acted upon in any of various ways as required. By way of example, the eggs may be candled in the zone 44 and for this purpose the plate 52 may be extended and provided with light transmitting slots 54 with the zone 44. Lights 56 located beneath the slots 54 serve to project light upward through the slots and the spaced and horizontally positioned eggs carried by the conveyor so as to permit candling of multiple rows of eggs as they are advanced by the conveyor 4.

In some constructions and for some purposes, the egg supporting spring members 20 of the conveying means may be held against rotation on the rods 14. However, when the eggs carried by the conveyor are to be candled, it is generally desirable to rotate the eggs immediately prior to or during the candling operation. For this purpose, driving means such as the belts 58 may pass over the upper surface of the slotted plate 52 in position to engage the larger portions 22 of the spring means. In this way, the eggs supported by the spring members may be rotated for candling or for any other purpose desired.

At such times, the spring means 20 may be so expanded that the flanged rollers 16 adjacent the ends of the spring means are not forcibly pressed against the ends of the springs and the springs may be rotated by the belts 58 independently of the rods 14 and the rollers 16.

Moreover, the eggs which have been candled during their passage over the slots 54 in the plate 52 may be moved on further to other egg handling equipment. Thus, the springs 20 may be further expanded as they approach the discharge end 60 of the equipment by engagement of the flanged rollers 16 with the outwardly diverging surfaces 18C. The recesses 26 and eggs 46 will then be spaced apart sufficiently for their movement to an egg grader as shown in FIGS. 1, 2 and 6. Such an egg grader may be of the type shown and described in U.S. Patent No. 2,246,597 and may be located adjacent the discharge end 60 of the equipment. When so arranged, an egg moving bar 62 is movable within a channel 64 extending transversely across the end of the conveyor. Suitable pulleys 66 which are formed to receive enlarged portions 72 of the egg supporting members 20 are arranged to receive and move the spring members whereas guide means 68 on the inner side of channel 64 directs the eggs onto the egg moving bar 62. A flexible or cushioning strip 70 is located on the opposite side of the channel 64 to aid in holding the eggs or articles in place over the channel 64 in which the egg moving bar 62 is movable. The conveyor 4 is then advanced step by step or otherwise in timed relation to the egg moving bar 62 so that six eggs will be positioned at the top of the channel 64 and above the egg moving bar in each cycle of operation. The egg moving bar is then operable to raise and advance six eggs at a time to the weighing means or other means by which the candled eggs are to be handled.

The construction thus provided is simple and economical to produce and use and is variable to change the arrangement and the relative positions of the eggs or other articles handled thereby so that they may further be operated on by various other types of equipment. In fact, the equipment shown and described may be varied in its operation to attain quite different results. Thus, if desired, the equipment shown in FIGS. 1 to 6 and described above may be operated in the reverse direction to assemble or arrange eggs for packing. Thus, eggs may be transferred to the conveyor 4 from egg handling means such as the egg moving bar 62 or other egg conveying means associated with some other type of equipment. The side chains 6, transverse rods 14 and egg supporting spring members 20 of the conveyor are then moved in the direction of the dotted arrow 38A of FIG. 1 to cause eggs from the egg moving bar 62 or other egg moving means to be transferred to the spaced and elongated egg receiving cavities 26 of the conveyor 4. At this time the spring members 20 may be fully expanded and if desired, they may be rotated by the belts 58 to cause the eggs to assume horizontal positions properly located within the cavities 26 before the egg supporting members 20 are shortened or compressed by the converging portions 18C and 18B of the guide surfaces 18.

When the egg receiving cavities 26 of the conveyor 4 are compressed or shortened, the eggs are caused to shift their positions within the cavities 26 until they are erect and the long axis of the eggs extend vertically as shown in full lines in FIG. 5. The eggs then are positioned relatively close together and are arranged so that they may be removed from the conveyor in groups by egg lifting means 32 or the like for packing or other purposes.

It will, therefore, be apparent that equipment embodying the present invention may be employed in carrying out many different operations such as cleaning, washing, drying, counting, marking, oiling, sanitizing or breaking eggs as well as the candling and packing operations described.

It has been found in operation that the eggs will shift most readily from one position to another when the coiled spring members are formed of metal such as stainless steel wire for example. The eggs can then slip or move most readily within the egg receiving cavities 26. Nevertheless, for some purposes, if desired, the spring members may be coated with rubber, plastic or other coating material for the purpose of protecting the spring members or in order to limit or control the movement or shifting of the eggs or other articles within the cavities of the conveyor.

The egg or article supporting members of the conveyor may conveniently be formed entirely of light-weight coiled spring material extending substantially the full width of the conveyor. However, if desired, the egg supporting means may be formed of a series of alternate rubber, wooden or plastic spools with intermediate spring elements. Thus, as shown in FIG. 7, the egg supporting means may be provided with spools or other members 72 of fixed size and shape and of relatively large diameter which are held in spaced relation by spring elements 74 of smaller diameter. The spools 72 and the spring elements 74 may be carried by rods 76 supported by side chains 78 or be otherwise mounted or moved as desired in any installation. Such an assembly provides the open or reticulated zones adjacent the larger portions of the eggs where it may be desired to pass light, washing liquid or air into contact with the eggs or articles or to permit the movement of brushes or other article engaging means into contact with the articles located on the supporting means. At the same time the relatively rigid spools 72 may be opaque so that they not only aid in supporting the eggs or articles but also serve as light shields positioned between the eggs and the light transmitting slots of egg candling equipment.

It will also be apparent that the relatively large and relatively small portions of the egg supporting means, whether formed of coiled spring material or not, need not be symmetrical in shape. They may instead be formed to provide article receiving cavities which are unsymmetrical as exemplified by the cavities provided in the egg conveying means of U.S. Patent No. 2,961,087. Moreover, if desired, one-half or any part of any egg or article receiving cavity in the assembly may be formed of coiled spring material while the other half or part is formed of rigid material. In this way, one-half or portion only of any cavity may be caused to change its shape or position upon shortening or expanding the supporting means so that both the shape and the position of the article receiving cavities may be varied as desired.

That form of the invention illustrated and described above is designed particularly for use in the handling of eggs. However, equipment embodying the present invention may be used in cleaning, grading, handling, or otherwise operating upon other types of articles such as fruits, vegetables, or mechanical elements which require examination, cleaning, washing, or other treatment. In this connection, the invention is particularly applicable to those articles which are not spherical or uniform in shape such as pears and other unsymmetrical articles.

It will thus be apparent that the article supporting means of the present invention and the uses and application thereof may be varied greatly in their form, size, operation and combinations with other elements in the handling of eggs or other articles. It should, therefore, be understood that the particular embodiments of the invention shown in the drawings and described above are intended to to be illustrative only and are not intended to limit the scope of the invention.

We claim:

1. Article supporting means comprising a pair of parallel rods, each of which rods has a coiled spring member surrounding the same, said coiled spring members having alternately arranged, longitudinally adjacent portions of relatively large diameter and of relatively small diameter, the portions of adjacent coiled spring members which are of relatively small diameter being positioned to cooperate in defining an article receiving recess therebetween.

2. Article supporting means comprising two parallel members, each of which is formed with a plurality of portions of relatively large diameter spaced longitudinally of said member by portions of relatively smaller diameter, said portions of relatively large diameter on said parallel members being aligned and cooperating with said portions of relatively smaller diameter to define a row of article receiving recesses between said parallel members, at least some of said portions being formed of coiled spring material compressible longitudinally of said members to vary the relative position and shape of said article receiving recesses.

3. Article handling equipment comprising a conveyor having means thereon extending transversely of the conveyor and defining a row of article receiving recesses, said means including coiled spring members movable to and from extended and contracted positions to vary the distance between the article receiving recesses in said row.

4. Article handling equipment comprising a conveyor having article supporting means thereon defining a row of article receiving recesses extending transversely of the conveyor, said article supporting means including coiled spring members movable to alter the length thereof so as to vary the relative positions of said recesses, and means positioned adjacent said conveyor and engageable with said article supporting means for effecting such variation in the length of said article supporting means.

5. A conveyor comprising spaced parallel side chains with a plurality of parallel rods extending transversely of the conveyor from one of said side chains to the other, adjacent rods on said conveyor having coiled spring members surrounding the same and provided with longitudinally adjacent portions of relatively large diameter and of relatively small diameter, the portions of said coiled spring members of relatively small diameter on adjacent rods cooperating to define a plurality of article receiving recesses between said rods, said coiled spring members being movable on said rods to vary the relative positions of said recesses.

6. A conveyor comprising spaced parallel side chains with a plurality of parallel rods extending transversey of the conveyor from one of said side chains to the other, adjacent rods on said conveyor having coiled spring members surrounding the same and provided with longitudinally adjacent portions of relatively large diameter and of relatively small diameter, the portions of said coiled spring members of relatively small diameter on adjacent rods thereon cooperating to define a plurality of article receiving recesses between said rods, said coiled spring members being movable on said rods to vary the shape of said recesses.

7. A conveyor comprising a plurality of parallel means extending transversely of the conveyor and having alternately arranged, longitudinally adjacent portions of relatively large diameter and of relatively small diameter, said portions of relatively small diameter on adjacent means cooperating to define a plurality of transversely extending rows of article receiving recesses, at least a portion of said means consisting of coiled spring elements through which articles in said recesses are accessible from both the upper and the lower surfaces of the conveyor.

8. Egg handling equipment comprising a support, track means extending lengthwise of said support on opposite sides thereof, a conveyor having side chains movable along said track means lengthwise of said support, a plurality of parallel rods carried by said side chains and extending transversely of said conveyor, and coiled spring elements arranged coaxially with respect to said rods, said coiled spring elements presenting spaced cooperating surfaces defining opposite sides of a row of egg receiving recesses extending transversely of the conveyor.

9. Egg handling equipment comprising a support, track means extending lengthwise of said support on opposite sides thereof, a conveyor having side chains movable along said track means lengthwise of said support, a plurality of parallel rods carried by said side chains and extending transversely of said conveyor, coiled spring elements arranged coaxially with respect to said rods, said coiled spring elments presenting spaced cooperating surfaces defining opposite sides of a row of egg receiving recesses extending transversely of the conveyor, and means located on at least one side of said conveyor and at a predetermined point adjacent the path of movement of said conveyor for compressing said spring means and varying the relative positions of said egg receiving recesses.

10. Egg handling equipment comprising a support having a conveyor movable longitudinally thereof, said conveyor embodying a plurality of parallel rods extending transversely of the conveyor, coiled spring members arranged concentrically about said rods and presenting a plurality of portions of relatively large diameter spaced apart lengthwise of said rods by portions of said spring members which are of relatively smaller diameter, the portions of said spring members on adjacent rods which are of relatively smaller diameter being in alignment lengthwise of the conveyor and cooperating to define at least portions of the opposite sides of a row of egg receiving recesses extending transversely of said conveyor, and means for moving said conveyor lengthwise of said support.

11. Egg handling equipment comprising a support having a conveyor movable longitudinally thereof, said conveyor embodying a plurality of parallel rods extending transversely of the conveyor, coiled spring members arranged concentrically about said rods and presenting a plurality of portions of relatively large diameter spaced apart lengthwise of said rods by portions of said spring members which are of relatively smaller diameter, the portions of said spring members on adjacent rods which are of relatively smaller diameter being in alignment lengthwise of the conveyor and cooperating to define at least portions of the opposite sides of a row of egg receiving recesses extending transversely of said conveyor, means for moving said conveyor lengthwise of said support, and means located adjacent said spring members operable to compress the same during longitudinal movement of the conveyor to alter the relative positions of said egg receiving recesses in the conveyor.

12. Egg handling equipment comprising a support having a conveyor movable longitudinally thereof, said conveyor embodying a plurality of parallel rods extending transversely of the conveyor, coiled spring members arranged concentrically about said rods and presenting a plurality of portions of relatively large diameter spaced apart lengthwise of said rods by portions of said spring members which are of relatively smaller diameter, the portions of said spring members on adjacent rods which are of relatively smaller diameter being in alignment lengthwise of the conveyor and cooperating to define at least portions of the opposite sides of a row of egg receiving recesses extending transversely of said conveyor, means for moving said conveyor lengthwise of said support, and means movable to rotate said spring members during the longitudinal movement of said conveyor.

13. Egg handling equipment comprising a support having a conveyor movable longitudinally thereof, said conveyor embodying a plurality of parallel rods extending transversely of the conveyor, coiled spring members arranged concentrically about said rods and presenting a plurality of portions of relatively large diameter spaced apart lengthwise of said rods by portions of said spring members which are of relatively smaller diameter, the portions of said spring members on adjacent rods which are of relatively smaller diameter being in alignment lengthwise of the conveyor and cooperating to define at least portions of the opposite sides of a row of egg receiving recesses extending transversely of said conveyor, means for moving said conveyor lengthwise of said support, and means for moving eggs located in said egg receiving recesses from one of two alternate positions to the other of said positions including elements for varying the length of said coiled spring members, the eggs when in one of said two positions having their longer axes parallel and extending substantially vertically and when in the other of said two positions having their longer axes extending substantially horizontally.

14. Egg handling equipment comprising a support having a conveyor movable longitudinally thereof, said conveyor embodying a plurality of parallel rods extending transversely of the conveyor, coiled spring members arranged concentrically about said rods and presenting a plurality of portions of relatively large diameter spaced apart lengthwise of said rods by portions of said spring members which are of relatively smaller diameter, the portions of said spring members on adjacent rods which are of relatively smaller diameter being in alignment lengthwise of the conveyor and cooperating to define at least portions of the opposite sides of a row of egg receiving recesses extending transversely of said conveyor, means for moving said conveyor lengthwise of said support, means for moving eggs located in said egg receiving recesses from one of two alternate positions to the other of said positions including elements for varying the length of said coiled spring members, the eggs when in one of said two positions having their longer axes parallel and extending substantially vertically and when in the other of said two positions having their longer axes extending substantially horizontally, and means adjacent one end of said conveyor for receiving eggs from the conveyor which are arranged with their axes horizontal.

15. Egg handling equipment comprising a support having a conveyor movable longitudinally thereof, said conveyor embodying a plurality of parallel rods extending transversely of the conveyor, coiled spring members arranged concentrically about said rods and presenting a plurality of portions of relatively large diameter spaced apart lengthwise of said rods by portions of said spring members which are of relatively smaller diameter, the portions of said spring members on adjacent rods which are of relatively smaller diameter being in alignment lengthwise of the conveyor and cooperating to define at least portions of the opposite sides of a row of egg receiving recesses extending transversely of said conveyor, means for moving said conveyor lengthwise of said support, means for moving eggs located in said egg receiving recesses from one of two alternate positions to the other of said positions including elements for varying the length of said coiled spring members, the eggs when in one of said two positions having their longer axes parallel and extending substantially vertically and when in the other of said two positions having their longer axes extending substantially horizontally, and a second egg conveyor movable transversely of the first mentioned conveyor adjacent the end thereof for receiving and removing eggs which are positioned with their axes horizontal.

References Cited in the file of this patent

UNITED STATES PATENTS

| 1,677,656 | Roberts | July 17, 1928 |
| 2,054,294 | McHenry | Sept. 15, 1936 |
| 2,393,471 | Johnson | Jan. 22, 1946 |
| 2,531,292 | Page | Nov. 21, 1950 |
| 2,711,813 | Jordan | June 28, 1955 |

FOREIGN PATENTS

| 126,728 | Sweden | Nov. 15, 1949 |